United States Patent [19]

Patzke et al.

[11] 4,301,056

[45] Nov. 17, 1981

[54] ORGANOPOLYSILOXANE ELASTOMERS

[75] Inventors: Jörg Patzke; Karl-Heinrich Wegehaupt, both of Burghausen, Fed. Rep. of Germany

[73] Assignee: Wacker-Chemie GmbH, Munich, Fed. Rep. of Germany

[21] Appl. No.: 129,943

[22] Filed: Mar. 13, 1980

[30] Foreign Application Priority Data

Mar. 22, 1979 [DE] Fed. Rep. of Germany ....... 2911352

[51] Int. Cl.$^3$ ............................................. C08L 83/04
[52] U.S. Cl. ................................................. 260/37 SB
[58] Field of Search .................................... 260/37 SB

[56] References Cited

U.S. PATENT DOCUMENTS

| | | | |
|---|---|---|---|
| 2,860,083 | 11/1958 | Nitzsche et al. | 260/37 SB |
| 3,264,258 | 8/1966 | Ceyzeriat | 260/37 SB |
| 3,649,588 | 3/1972 | Kennedy-Skipton | 260/37 SB |
| 3,821,140 | 6/1974 | Milbert | 260/37 SB |
| 4,075,154 | 2/1978 | Itoh et al. | 260/37 SB |

*Primary Examiner*—Lewis T. Jacobs

[57] ABSTRACT

Elastomers which are obtained by crosslinking an organopolysiloxane composition containing a diorganopolysiloxane, an organic peroxide and calcium hydroxide which has been treated with an organosilicon compound to impart hydrophobic properties thereto.

6 Claims, No Drawings

ORGANOPOLYSILOXANE ELASTOMERS

The present invention relates to an organopolysiloxane composition and more particularly to an organopolysiloxane elastomer which is obtained by crosslinking an organopolysiloxane composition containing calcium hydroxide to provide an elastomer having improved resistance to reversion.

BACKGROUND OF THE INVENTION

Organopolysiloxane compositions which can be crosslinked with an organic peroxide compound and which contain barium peroxide, barium oxide or magnesium oxide are described in U.S. Pat. Nos. 3,261,801 to Wormuth, 3,468,838 to Loraine et al and 3,865,778 to Christie. Also U.S. Pat. No. 3,004,859 to Lichtewallner, German Pat. No. 1,141,082 to Dow Corning Corporation and British Pat. No. 1,132,853 to Midland Silicones Limited describe diorganopolysiloxane-based compositions which can be crosslinked with an organic peroxide, containing at least one inorganic solid which can be treated with an organosilicon compound to render the same hydrophobic. However, none of the organopolysiloxane compositions known heretofore which can be crosslinked with organic peroxide compounds contain calcium hydroxide which has been treated with an organosilicon compound to render the same hydrophobic to form elastomers which after heating in the presence of air have a low compression set, have increased resistance to reversion in a sealed system and exhibit increased stability to hot fluid hydrocarbons, or partially oxidized hot fluid hydrocarbons or not motor oils.

Therefore, it is an object of this invention to provide organopolysiloxane compositions which are crosslinked with organic peroxide compounds to form elastomers. Another object of this invention is to provide crosslinkable organopolysiloxane compositions which contain a basic solid that is treated with a compound capable of imparting hydrophobic properties to the basic solid. Still another object of this invention is to provide an organopolysiloxane elastomer having improved compression set. A further object of this invention is to provide organopolysiloxane elastomers having increased resistance to reversion in a sealed system. A still further object of this invention is to provide organopolysiloxane compositions, which are crosslinked with an organic peroxide compound, containing calcium hydroxide which has been treated with an organosilicon compound to render the calcium hydroxide hydrophobic.

SUMMARY OF THE INVENTION

The foregoing objects and others which will become apparent from the following description are accomplished in accordance with this invention, generally speaking, by incorporating in an organopolysiloxane composition which is capable of being crosslinked with an organic peroxide compound to form an elastomer, calcium hydroxide which has been treated with an organosilicon compound to impart hydrophobic properties to the calcium hydroxide. The resultant elastomers exhibit improved compression set, improved resistance to reversion and increased stability to hot hydrocarbon fluids.

The increased resistance to reversion of the elastomers of this invention in a closed system is quite unexpected in view of U.S. Pat. No. 3,261,801 to Wormuth, which discloses that calcium oxide adversely affects the heat age characteristics of an organopolysiloxane elastomer. Since calcium hydroxide is very similar to calcium oxide, it would be expected that calcium hydroxide would likewise adversely affect the heatage properties of the elastomer.

DETAILED DESCRIPTION OF THE INVENTION

The diorganopolysiloxanes used in the compositions of this invention are the same diorganopolysiloxanes which could have been or have been used heretofore in the preparation of elastomers from diorganopolysiloxane-based compositions which can be crosslinked by means of organic peroxide compounds. The preferred diorganopolysiloxanes may be represented by the formula.

in which R represents the same or different, monovalent hydrocarbon radicals or substituted monovalent hydrocarbon radicals, Z represents a hydroxyl group, n is 0 or 1, and x represents a number having a value of at least 100. The values for n may be the same or different in different molecules. Likewise, the values for x may also be different in different molecules.

Even though this is generally not shown in a formula of this type, siloxane units other than the diorganosiloxane units ($SiR_2O$) may be present within or along the siloxane chain, although these are present only as impurities. Examples of such other siloxane units are those of the formulas $RSiO_{3/2}$, $R_3SiO_{1/2}$ and $SiO_{4/2}$, where R is the same as above. However, it is preferred that siloxane units other than the diorganosiloxane units be present in an amount of less than about 1 mole percent of the diorganopolysiloxane.

Examples of hydrocarbon radicals represented by R are alkyl radicals, such as the methyl, ethyl, n-propyl and the isopropyl radical as well as octadecyl radicals; alkenyl radicals such as the vinyl, butadienyl and the allyl radicals; cycloaliphatic hydrocarbon radicals such as the cyclopentyl and cyclohexyl radicals, as well as cyclohexenyl and methylcyclohexyl radicals; aryl radicals such as the phenyl radical; aralkyl radicals such as the benzyl and beta-phenylethyl radicals; as well as arkaryl radicals such as the tolyl radicals.

Preferred examples of substituted monovalent radicals represented by R are halogenated hydrocarbon radicals, such as the 3,3,3-trifluoropropyl radical as well as chlorophenyl radicals and bromotolyl radicals and cyanoalkyl radicals such as the beta-cyanoethyl radical.

Because they are readily available, it is preferred that at least 80 percent of the R radicals be methyl radicals. The R radicals present in addition to the methyl radicals are preferably vinyl and/or phenyl groups. In order to obtain elastomers having good physical properties, for example, high tensile strength, it is preferred that 0.01 mol percent of the R radicals in the diorganopolysiloxane be a vinyl group.

The value of x is preferably high enough that the viscosity of the diorganopolysiloxane forming the base of the compositions is at least $10^6$ mPa.S at 25° C., or that the organopolysiloxane on which the composition is based have a plasticity of from 50 to 1000 and more preferably from 150 to 800 mkp as determined with a Brabender Plastograph at 25° C. and 60 revolutions per minute.

Calcium hydroxide which has been treated with an organosilicon compound to impart hydrophobic properties thereto is generally known and is commercially available. Calcium hydroxide can be rendered hydrophobic with an organosilicon compound by reacting calcium oxide with an emulsion of an organopolysiloxane containing on the average from 0.8 to 2.1, preferably from 0.9 to 1.8 of SiC-bonded hydrocarbon radicals and more preferably methyl radicals per silicon atom, in water, and by subsequently drying and if necessary grinding the products thus obtained to obtain a material having a powdery consistency. Such processes for treating calcium hydroxide with an organosilicon compound to impart hydrophobic properties thereto are for example described in British Pat. No. 1,217,813, to Wacker-Chemie GmbH, and French Pat. No. 2,341,635 to Wacker-Chemie GmbH.

Also, calcium hydroxide may be rendered hydrophobic with an organosilicon compound by treating the calcium hydroxide surface with any organosilicon compound capable of imparting hydrophobic properties to inorganic substances, in the presence of less than about 10 percent by weight of water based on the weight of the organosilicon compound capable of inducing hydrophobic properties.

Examples of organosilicon compounds which may be used to induce hydrophobic properties to inorganic substances are those of the formula:

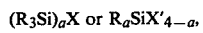

where R is the same as above, X and X' represent halogen, hydrogen or a radical of the formula —OH, —OR', —NR'Y, —ONR'$_2$, —SR' or —OOCR', where R' is an alkyl radical or a substituted alkyl radical having from 1 to 4 carbon atoms, Y is hydrogen, or has the same meaning as R', and a is 1 or 2, with the proviso that X may also represent —O—, —N(X)— or —S— when a is 2; as well as octamethylcyclotetrasiloxane and/or dimethylpolysiloxanes having from 2 to 12 siloxane units per molecule and an Si-bonded hydroxyl group in each of the terminal units.

All the examples of SiC-bonded hydrocarbon radicals and substituted hydrocarbon radicals in the diorganopolysiloxane which constitutes the base of the composition are equally applicable to the R radicals in the above formula for organo-silicon compounds which can be used to impart hydrophobic properties to inorganic substance.

Examples of halogen atoms represented by X and X' are chlorine, bromine and iodine, with chlorine being the preferred example since it is readily available.

Preferred examples of hydrocarbon radicals represented by R' are the methyl and the ethyl radicals. Other examples of hydrocarbon radicals represented by R' are those which are present in the specific examples of organosilicon compounds which may be used to render the calcium hydroxide hydrophobic.

Examples of substituted hydrocarbon radicals represented by R' are the methoxyethylene and the aminoethyl radicals.

Examples of organosilicon compounds which correspond to the above formula, which may be used to impart hydrophobic properties to the treated materials are hexamethyldisilazane, trimethylethoxysilane, trimethylsilane, trimethylchlorosilane, dimethyldiethoxysilane, trimethylsilylmercaptan, vinyldimethylacetoxysilane, trimethylsilylisopropylamine, trimethylsilyethylamine, phenyldimethylsilylpropylamine, vinyldimethylsilylbutylamine, diethylaminoxytrimethylsilane, diethylaminoxyphenyldimethylsilane, hexamethyldisiloxane, 1,3-divinyl-1, 1,3,3-tetramethyldisiloxane, 1,1-diphenyl-1,1,3,3-tetramethyldisilazane, diphenyldiethoxysilane, dimethyldichlorosilane, dimethyldimethoxysilane, vinylmethyldimethoxysilane and methyltriethoxysilane.

Mixtures of various organosilicon compounds may be used to treat calcium hydroxide to impart hydrophobic properties thereto.

In the preparation of the calcium hydroxide having hydrophobic properties from an organosilicon compound, it is preferable that from 5 to 150 percent by weight of organosilicon compound based on the weight of the calcium hydroxide or calcium oxide be used either in the absence or presence of water.

The reaction of the calcium hydroxide surface with a hydrophobic-inducing organosilicon compound in the presence of less than 10 percent by weight of water based on the weight of the organosilicon compound, may take place by any means which have been used or could have been used heretofore in treating the surfaces of inorganic substances which are solid at room temperature and which have a particle diameter of less than 10 mm, with an organosilicon compound. For example, this reaction can be carried out by mixing calcium hydroxide with the organosilicon compound capable of inducing hydrophobic properties which evaporates at room temperature and at 1 bar and placing the mixture in a sealed container such as a polyethylene bag, wherein it remains for at least 10 days.

The compositions of this invention preferably contain from 0.1 to 20 percent by weight based on the total weight of the composition of calcium hydroxide which has been rendered hydrophobic with an organosilicon compound.

These compositions may be crosslinked by means of any organic peroxide compound which have been or could have been used heretofore in the preparation of elastomers from diorganopolysiloxane-based compositions. Examples of such peroxide compounds are acyl peroxides such as dibenzoyl peroxide, bis-(4-chlorobenzoyl)-peroxide and bis-(2,4-dichlorobenzoyl)-peroxide; alkylperoxides and arylperoxides, such as di-tert-butylperoxide and dicumyl peroxide; perketals such as 2,5-bis-(tert-butylperoxy) -2,5-dimethylhexane; peresters, such as diacetylperoxydicarbonate, tert-butyl-perbenzoate, tert-butylperoxyisopropylcarbonate and tert-butyl-perisononanoate as well as tert-butyl-beta-hydroxylethylperoxide.

In addition to the diorganopolysiloxane and the calcium hydroxide which has been rendered hydrophobic with an organosilicon compound as well as an organic peroxide compound, the compositions of this invention may of course contain other substances which have been or could have been added heretofore to diorganopolysiloxane-based compositions of this type. Examples of such additives are reinforcing fillers, non-reinforcing fillers, anti-structuring agents, such as low-molecular weight siloxanols or alkoxysilanes, pigments, antioxidants as well as additives which decrease residual compression deformation ["compression set"] other than the calcium hydroxide having hydrophobic properties, heat stabilizers, plasticizers such as trimethylsiloxy endblocked dimethylpolysiloxanes having a viscosity of about 100 mPa.S at 25° C., fire retardant agents, UV stabilizers, agents which influence the elastomer's electrical properties, such as conductive carbon, and cell-generating agents such as azodicarbonamide.

Examples of reinforcing fillers, i.e., fillers having a surface area of at least 50 m$^2$/g as determined by the BET method, are pyrogenically produced silicon dioxides, silicic acid hydrogels which have been dehydrated while maintaining their structure, and other types of precipitated silicon dioxide having a surface area of at least 50 m$^2$/g and metal oxides, such as titanium dioxide, ferric oxide, aluminum oxide and zinc oxide, provided they have a surface area of at least 50 m$^2$/g.

Examples of non-reinforcing fillers, i.e., fillers having a surface area of less than 50 m$^2$/g as determined by the BET method, are quartz meal, diatomaceous earth, Neuburg chalk, calcium silicate, magnesium oxide, magnesium silicate, zirconium silicate, calcium carbonate, in for example, the form of ground chalk and calcined aluminum silicate.

All of the fillers described above may be treated with, for example, trimethoxysilane to impart hydrophobic properties thereto. If desired, the fillers as well as the calcium hydroxide, can be treated with a hydrophobic agent in, for example, a ball mill.

The various constituents of the compositions of this invention may be mixed in any desired sequence. It is preferred that the mixing take place at temperatures in the range of from 0° to about 200° C. However, it is preferred that the organic peroxide compound be added last and at temperatures at which the organic peroxide compound does not decompose too quickly.

The compositions of this invention may be crosslinked at any temperature which is suitable for crosslinking diorganopolysiloxane-based compositions by means of an organic peroxide compound, preferably at temperatures of from 100° to about 220° C.

The compositions of this invention may be used whereever elastomers obtained from diorganopolysiloxane-based compositions which are crosslinked by organic peroxide compounds have been or could have been used heretofore, especially where good mechanical properties are required even at temperatures in excess of 50° C. over prolonged periods of time. Thus, they may be used in the manufacture of electrical insulators, especially in cables which are coiled prior to heat tempering, as well as in manufacturing seals and hoses which are exposed to hot hydrocarbons or to other motor oils, as well as for manufacturing other electrical conductive or non-conductive molded objects.

In the following examples all parts and percentages are by weight unless otherwise specified. The surface area of the silicon dioxide used in the examples is determined by the BET method.

The calcium hydroxide used in the following examples was rendered hydrophobic by the following technique:

Products which are obtained from the direct synthesis method for preparing methylchlorosilanes by reacting methyl chloride with silicon in accordance with Rochow, which boil at between 100° and 150° C. at 1 bar, are poured into water. The resulting oily phase is then emulsified in the same amount of water which contains 1 percent by weight of polyvinyl alcohol having residual acetyl groups (saponification number 140; i.e., mg KOH, required for the separation of the residual acetyl groups and the neutralization of the acetic acid formed in one gram of the polyvinyl alcohol; viscosity of 25 mPa.S, as measured in a 4 percent aqueous solution at 20° C. About 50 g of the aqueous solution obtained is then mixed with 5 g of water, 2 g of sodium lauryl sulfate and 50 g of calcium oxide powder. The product consists of calcium hydroxide powder which has been rendered hydrophobic with the organosilicon compound, and containing between 0.75 and 1.1 percent by weight of free water.

EXAMPLE 1

A laboratory-type twin roller mill is used to mix the following ingredients: 100 parts of a trimethylsiloxy endblocked diorganopolysiloxane which consists of 99.5 mole percent of dimethylsiloxane units and 0.5 mole percent of vinylmethylsiloxane units (plasticity: 650 mkp as determined with a Brabender Plastograph at 25° C. and 60 rpm), and 8 parts of a dimethylpolysiloxane having an Si-bonded hydroxyl group in each of its terminal units and contains a total of 5 percent hydroxyl groups, about 48 parts of a pyrogenically produced silicon dioxide having a surface area of 130 m$^2$/g, about 48 parts of diatomaceous earth, and 2 g of calcium hydroxide which has been rendered hydrophobic with an organosilicon compound. One of the organic peroxide compounds listed in Table I is incorporated in each 100 parts of the mixture obtained in the quantities indicated in Table I. The compositions so obtained are then crosslinked under the conditions indicated in Table I. After crosslinking, and after heating for 4 hours at 200° C. while exposed to air the resultant elastomers have the properties shown in Table I.

Comparison Example (a)

The procedure described in Example 1 is repeated, except that no calcium hydroxide at all is used. The results are shown in Table I.

TABLE I

| | 1 part dibenzoyl peroxide (1) crosslinking time: 10 minutes crosslinking temp. 135° C. | | | | 1 part bis-(2,4-dichlorobenzoyl)- peroxide (1) crosslinking time: 10 minutes crosslinking temp. 135° C. | | | | 0.6 parts dicumyl peroxide (2) crosslinking time: 15 minutes crosslinking temp. 165° C. | | | |
|---|---|---|---|---|---|---|---|---|---|---|---|---|
| | Example 1 | | Comparison Example (a) | | Example 1 | | Comparison Example (a) | | Example 1 | | Comparison Example (a) | |
| | (4) | (5) | (4) | (5) | (4) | (5) | (4) | (5) | (4) | (5) | (4) | (5) |
| Shore A Hardness | 73 | 82 | 76 | 84 | 66 | 77 | 68 | 80 | 74 | 82 | 78 | 86 |
| Tensile strength N/mm$^2$ | 5.4 | 6.5 | 5.2 | 7.0 | 5.0 | 6.0 | 5.1 | 6.8 | 5.2 | 6.4 | 5.3 | 6.1 |
| Elongation at rupture, Percent | 220 | 140 | 190 | 130 | 310 | 210 | 290 | 160 | 150 | 120 | 170 | 120 |
| Resistance to tearing, N/mm | 11.5 | 11.5 | 10.2 | 10.3 | 13.2 | 14.7 | 13.3 | 10.8 | 15.0 | 12.1 | 10.3 | 11.6 |
| Compression set, | 27.9 | 23.4 | 76.8 | 42.5 | 35.5 | 20.5 | 100.0 | 58.5 | 18.4 | 13.5 | 23.6 | 14.4 |

TABLE I-continued

| | 1 part dibenzoyl peroxide (1) crosslinking time: 10 minutes crosslinking temp. 135° C. | | | | 1 part bis-(2,4-dichlorobenzoyl)- peroxide (1) crosslinking time: 10 minutes crosslinking temp. 135° C. | | | | 0.6 parts dicumyl peroxide (2) crosslinking time: 15 minutes crosslinking temp. 165° C. | | | |
|---|---|---|---|---|---|---|---|---|---|---|---|---|
| | Example 1 | | Comparison Example (a) | | Example 1 | | Comparison Example (a) | | Example 1 | | Comparison Example (a) | |
| | (4) | (5) | (4) | (5) | (4) | (5) | (4) | (5) | (4) | (5) | (4) | (5) |
| Percent (3) | | | | | | | | | | | | |

(1) Paste prepared from equal parts of peroxide and a trimethylsiloxy endblocked dimethylpolysiloxane which has a viscosity of 250 mPa.S at 25° C.
(2) 95 percent.
(3) Determined after 22 hours heating at 175° C. with air contact.
(4) Determined prior to 4 hours heating at 200° C. with air contact.
(5) Determined after 4 hours heating at 200° C. with air contact.

EXAMPLE 2

About 100 parts of a trimethylsiloxy endblocked diorganopolysiloxane containing 99.93 mole percent of dimethylsiloxane units and 0.07 mole percent of vinylmethylsiloxane units, and having a viscosity of $8.10^6$ mPa.S at 25° C. are mixed in a kneader operated at 120° C., with 8 parts of a dimethylpolysiloxane having an Si-bonded hydroxyl group in each of its terminal units and having a total of 4 percent hydroxyl groups, and then with 36 parts of a pyrogenically produced silicon dioxide which has a surface area of 200 $m^2/g$. After it has cooled, 100 parts of the mixture thus obtained are mixed first with 10 parts of diatomaceous earth and then with 4 parts of calcium hydroxide which has been treated with the organosilicon compound to render it hydrophobic and then with 1.5 parts of a mixture consisting of 40 percent dicumyl peroxide and 60 percent chalk. The resultant composition is crosslinked by heating for 15 minutes to 165° C., to form an elastomer. After heating for 4 hours at 200° C., the elastomer has the properties shown in Table II.

Comparison Example (b)

The procedure described in Example 2 is repeated, except that no calcium hydroxide at all is used. The results are shown in Table II.

| | Example 2 | | Comparison Example (b) | |
|---|---|---|---|---|
| | (1) | (2) | (1) | (2) |
| Shore A Hardness | 46 | 46 | 47 | 47 |
| Tensile Strength N/mm² | 8.0 | 8.5 | 8.1 | 8.3 |
| Elongation at Rupture % | 730 | 680 | 680 | 650 |
| Compression set % (3) | 17.7 | 12.2 | 30.1 | 19.8 |

(1) Determined prior to 4 hours heating at 200° C. with air contact.
(2) Determined after 4 hours heating at 200° C. with air contact.
(3) Determined after 22 hours heating at 175° C. with air contact.

EXAMPLE 3

(a) About 100 parts of a trimethylsiloxy endblocked diorganopolysiloxane containing 99.9 percent of dimethylsiloxane units and 0.1 mole percent of vinylmethylsiloxane units and having a plasticity of 600 mkp as determined in a Brabender Plastograph at 25° C. and 60 rpm, are mixed with 3 parts of a dimethylpolysiloxane having an Si-bonded hydroxyl group in each of its terminal units and having a total of 3 percent hydroxyl groups, then with 6 parts of a hydrolyzate consisting of 76 parts of phenyltrichlorosilane and 40 parts of dimethyldichlorosilane containing 4 percent of Si-bonded hydroxyl groups and then with 40 parts of a pyrogenically produced silicon dioxide having a surface area of 150 $m^2/g$, and finally with a precipitated silicon dioxide having a surface area of 130 $m^2g$.

(b) About 40 parts of a trimethylsiloxy endblocked diorganopolysiloxane containing 99.93 mole percent of dimethylsiloxane units and 0.07 mole percent vinylmethylsiloxane units, and having a plasticity of 625 mkp (measured in a Brabender Plastograph at 25° C. and 60 rpm) are mixed in a kneader operated at 130° C. with 60 parts of a trimethylsiloxy endblocked diorganopolysiloxane containing 99.5 mole percent of dimethylsiloxane units and 0.5 mole percent vinylmethylsiloxane units and having a plasticity of 800 mkp (determined in a Brabender Plastograph at 25° C. and 60 rpm) and 5 parts of a diorganopolysiloxane having an Si-bonded hydroxyl group in each of its terminal units and which consists of about 50 mole percent of dimethylsiloxane units and about 50 mole percent of vinylmethylsiloxane units with a viscosity of 10,000 mPa.S at 25° C., and 2 parts of diphenylsilanediol, 3 parts of a diorganopolysiloxane having an Si-bonded hydroxyl group in each of its terminal units and which consists of 75 mole percent dimethylsiloxane units and 25 mole percent vinylmethylsiloxane units and having 3.8 percent hydroxyl groups and finally 48 parts of a pyrogenically produced silicon dioxide having a surface area of 150 $m^2/g$.

The mixtures prepared in accordance with the procedures described in (a) and (b) above are mixed in a weight ratio of 1:1. To about 100 parts of the mixture thus prepared are added 2 parts of a paste (heat-stabilizer) consisting of 50 percent lamp blank and 50 percent of a trimethylsiloxy endblocked diorganopolysiloxane containing 99.8 mole percent of dimethylsiloxane units and 0.2 mole percent of vinylmethylsiloxane units, about 2 parts of calcium hydroxide which has been treated with an organosilicon compound to impart hydrophobic properties thereto and 4 parts of a paste containing equal parts of bis-(2,4-dichlorobenzoyl)-peroxide and a trimethylsiloxy endblocked dimethylpolysiloxane which has a viscosity of 250 mPa.S at 25° C. A copper wire is coated with a sample of the organopolysiloxane composition thus prepared and then heated to 350° C. for 20 seconds to crosslink the organopolysiloxane composition. The tensile strength and the elongation at break of the organopolysiloxane elastomer on 10 cm long sections of the copper wire are then determined. The copper wire coated with the organopolysiloxane elastomer is then placed in 12 cm long glass tubes whose diameter is 1 mm larger than the diameter of the wire. Then the glass tubes are sealed and heated at 150° C. for 7, 14, 28 and 56 days respectively and thereafter the tensile strength and elongation at break of the insulation is again measured.

Comparison Example (c)

The procedure described in Example 3 is repeated, except that 2 parts of magnesium oxide are substituted for the 2 parts of calcium hydroxide treated with the organosilicon compound.

Comparison Example (d)

The procedure described in Example 3 is repeated, except that 2 parts of zinc oxide are substituted for the 2 parts of calcium hydroxide treated with the organosilicon compound.

Comparison Example (e)

The procedure described in Example 3 is repeated, except that the calcium hydroxide treated with the organosilicon compound is omitted.

The results of Example 3 and Comparison Examples (c), (d) and (e) are shown in Table III.

TABLE III

| | Tensile strength N/mm² | | | | | Elongation at Rupture % | | | | |
|---|---|---|---|---|---|---|---|---|---|---|
| | (1) | (2) | (3) | (4) | (5) | (1) | (2) | (3) | (4) | (5) |
| Example 3 | 63 | 61 | 52 | 41 | 39 | 260 | 200 | 180 | 180 | 170 |
| Comparison Example (c) | 65 | 42 | 56 | 50 | 33 | 190 | 150 | 150 | 120 | 120 |
| Comparison Example (d) | 63 | 30 | 21 | 16 | (6) | 180 | 40 | 20 | 20 | (6) |
| Comparison Example (e) | 65 | 9 | 13 | 26 | (6) | 250 | 80 | 50 | 50 | (6) |

(1) Prior to heating in glass tube.
(2) After 7 days heating in glass tube.
(3) After 14 days heating in glass tube.
(4) After 28 days heating in glass tube.
(5) After 56 days heating in glass tube.
(6) Not determined.

EXAMPLE 4

About 95 parts of a trimethylsiloxy endblocked diorganopolysiloxane containing 99.93 mole percent dimethylsiloxane units and 0.07 mole percent vinylmethylsiloxane units and having a viscosity of $8.10^6$ mPa.S are mixed with 5 parts of a diorganopolysiloxane consisting of 75 mole percent dimethylsiloxane units and 25 mole percent vinylmethylsiloxane units of which 40 percent by weight of the diorganopolysiloxane has Si-bonded hydroxyl groups in each terminal unit, while the remainder of the diorganopolysiloxane is endblocked with trimethylsiloxy groups; then with 20 parts of pyrogenically produced silicon dioxide having a surface area of 200 m²g which has been treated with a trimethylchlorosilane to render the silicon dioxide hydrophobic, then with 20 parts of a hydrophilic, pyrogenically produced silicon dioxide having a surface area of 200 m²/g; then with 6 parts of a hydroxyl terminated dimethylpolysiloxane which has a viscosity of 20 mPa.S at 25° C. and then with 0.5 part of vinyltriethoxysilane. The mixture is mixed in a kneading machine which is operated at room temperature. Within 2 hours the mixture is heated to 100° C. in a stream of nitrogen in order to remove the volatile components. About 100 parts of the mixture which has been freed of volatile components is then mixed with 8 parts of calcium hydroxide which has been treated with an organosilicon compound to render the same hydrophobic and then with 0.6 part of 95 percent dicumyl peroxide. This mixture is crosslinked by heating for 15 minutes to 165° C. to form an elastomer and then the resultant elastomer is heated to 200° C. for 4 hours in contact with air and then is finally heated to 150° C. in ASTM oil No. 2 over a period of 14 days, in order to test the resistance of the elastomer to oil. The results are shown in Table IV.

Comparison Example (f)

The process of Example 4 is repeated, except that the following ingredients are substituted for the 8 parts of calcium hydroxide which has been treated with an organosilicon compound to impart hydrophobic properties thereto:

(1) 8 parts of calcium carbonate.
(2) 8 parts of magnesium oxide.
(3) 2 parts of cerium dioxide.
(4) 4 parts of pyrogenically produced titanium dioxide.
(5) 2 parts of barium peroxide.
(6) 8 parts of zinc oxide.

The results are shown in Table IV.

TABLE IV

| | Shore-A-hardness | Shore A-hardness | Tensile Strength N/mm² | | Elongation at Rupture | | Compression Set | G |
|---|---|---|---|---|---|---|---|---|
| | | | (1) | (2) | (1) | (2) | (1) | |
| Example 4 | 51 | −10 | 8.2 | 6.2 | 820 | 705 | 16 | +6.9 |
| Comparison Example (f) | | | | | | | | |
| CaCO₃ | 51 | −20 | 9.2 | 8.4 | 800 | 195 | 42 | +13.7 |
| MgO | 57 | −16 | 8.6 | 6.3 | 730 | 660 | 30 | +7,4 |
| CeO₂ | 49 | −19 | 9.9 | 1.2 | 810 | 305 | 21 | +14.3 |
| TiO₂ | 50 | −20 | 8.9 | 0.8 | 790 | 160 | 30 | +12.8 |
| BaO₂ | 50 | −19 | 9.7 | 0.9 | 830 | 105 | 28 | +13.4 |
| ZnO | 53 | −17 | 9.1 | 5.9 | 770 | 720 | 28 | +7.9 |

(1) Prior ro oil immersion.
(2) After 14 days oil immersion.
Shore-A-hardness = difference in Shore-A-hardness before and after heating in oil.
G = weight change due to heating in oil.

What is claimed is:

1. An organopolysiloxane composition which is capable of being crosslinked with an organic peroxide containing at least 0.1 percent by weight based on the weight of the composition of calcium hydroxide which has been treated with an organosilicon compound to impart hydrophobic properties thereto.

2. The composition of claim 1, wherein the composition contains from 0.1 to 20 percent by weight of calcium hydroxide having hydrophobic properties based on the weight of the composition.

3. The composition of claim 1, wherein the calcium hydroxide is treated with an organosilicon compound selected from the group consisting of octamethylcyclotetrasiloxane, dimethylpolysiloxanes having from 2 to 12 siloxane units per molecule and an Si-bonded hydroxyl group in each of their terminal units and silanes of the formula $(R_3Si)X$ and $R_aSiX'_{4-a}$ where R is selected from the group consisting of monovalent hydrocarbon radicals and halogenated monovalent hydrocarbon radicals, X and X' are selected from the group consisting of halogen, hydrogen, —OH, —OR', —NR'Y, —ONR'$_2$, —SR' and —OOCR', where R' is selected from an alkyl radical and a substituted alkyl radical having from 1 to 4 carbon atoms, Y is selected from the group consisting of hydrogen and R', a is 1 or 2 and when a is 2, then X may also be selected from the group consisting of —O—, N(X)- and —S—.

4. The composition of claim 1, wherein the organopolysiloxane composition contains a diorganopolysiloxane of the formula $$Z_nSiR_{3-n}O(SiR_2O)_xSiR_{3-n}Z_n$$

where R is selected from the group consisting of monovalent hydrocarbon radicals and halogenated monovalent hydrocarbon radicals, Z is a hydroxyl group, n is 0 or 1 and x is a number having a value of at least 100.

5. The composition of claim 3, wherein the calcium hydroxide is treated with from 5 to 150 percent by weight of the organosilicon compound based on the weight of the calcium hydroxide.

6. An elastomer obtained from the composition of claim 1.

* * * * *